Dec. 13, 1960  E. JORGENSEN  2,964,243
STEAM TRAPS
Filed May 20, 1959
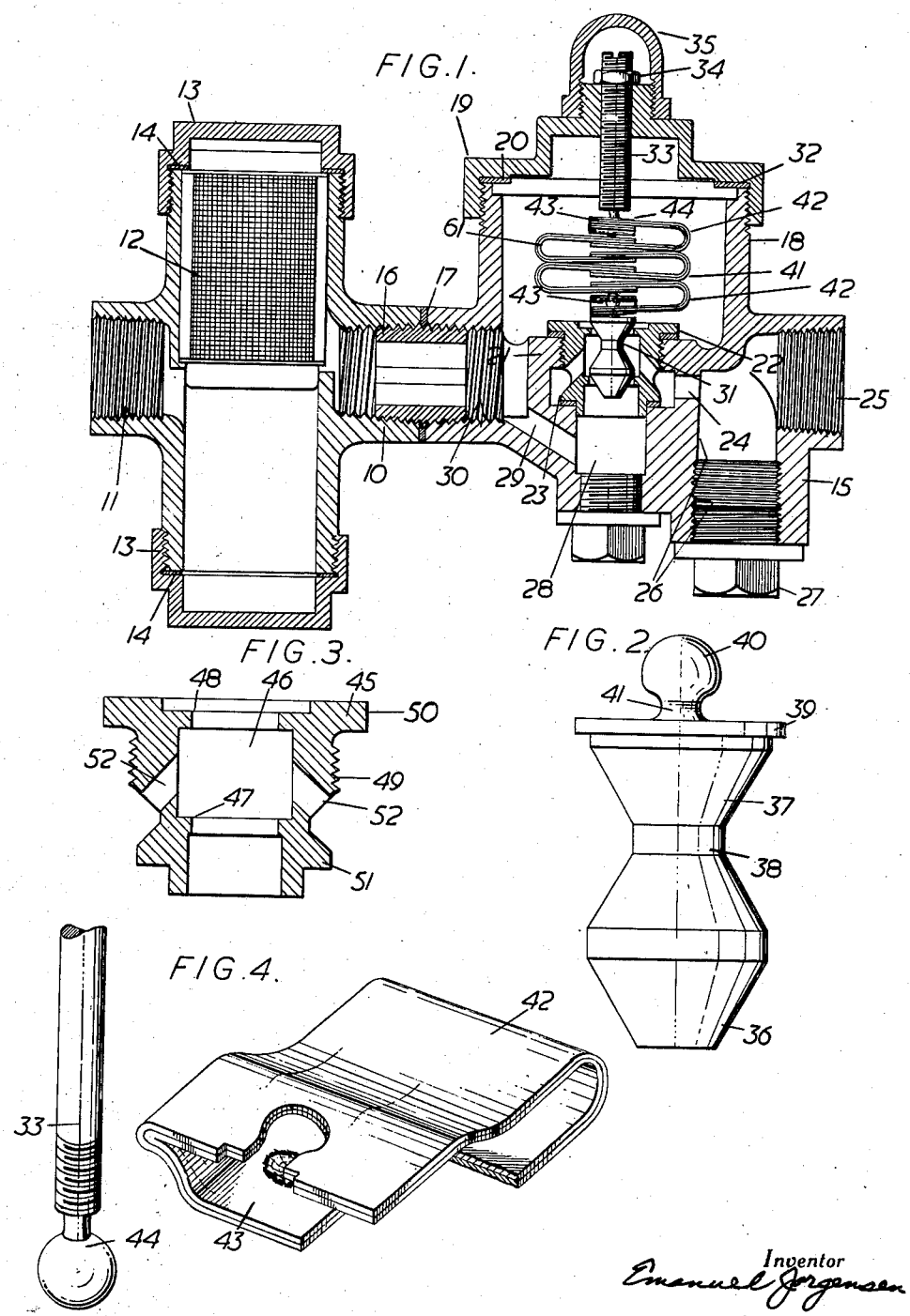

United States Patent Office 2,964,243
Patented Dec. 13, 1960

2,964,243

STEAM TRAPS

Emanuel Jorgensen, Four Acres, Station Road, Albrighton, near Wolverhampton, England Filed May 20, 1959, Ser. No. 814,577

2 Claims. (Cl. 236—59)

This invention relates to a thermostatically operated steam trap which is adapted to be connected to a steam line so that condensation can be automatically discharged from the line but steam is prevented from being discharged.

One object of the present invention is to provide improvements in a steam trap with the aim of increasing the sensitivity of operation and also of protecting the temperature sensitive element against over strain.

A further object of the invention is to provide improvements in a steam trap to facilitate the operation of servicing and repairing of the trap.

Another object of the invention is to facilitate manufacture and assembly of a steam trap and eliminate any error in operation which may arise out of possible manufacturing tolerances.

The invention is illustrated in the accompanying drawings, wherein,

Figure 1 is a section through a steam trap connected to a strainer and embodying features of the present invention.

Figure 2 is an enlarged view showing the formation of the valve member.

Figure 3 is an enlarged view showing details of the renewable valve seating.

Figure 4 is an enlarged exploded view showing details of the connection at one end of the bimetal element.

With references to Figure 1, the assembly comprises a strainer body 10 having an inlet opening and connection 11 suitably formed for connection to the steam line, and the body of the strainer being of substantially T form with a generally known form of strainer basket provided in one arm and indicated at 12.

The two arms of the strainer body are closed by removable end caps 13 with suitable sealing washers 14 located between the end caps and the arms of the body 10.

The strainer is connected to the main body 15 of the steam trap by means of an externally screwed nipple 16 with a suitable sealing washer 17 provided between the two parts.

The body 15 of the steam trap comprises an upper chamber 18 which houses the temperature sensitive element and is of generally cylindrical form, the outer end of this chamber 18 being closed by a screwed cap 19 with a suitable sealing washer 20 between the cap and the chamber 18.

Internally, the body of the trap is formed with a central portion 21 which forms a housing for the renewable valve seat member generally indicated at 22 and the part 21 being also formed with an internal annular passage 23 which communicates with a through passage 24 leading to the outlet from the steam trap.

Two alternative outlets 25, 26 are provided the one not in use being closed by a screwed cap 27.

Immediately below the part 21 of the body, there is formed an internal cylindrical well 28 which is axially in line with the axis of the part 21 and extending away from this well 28 is a through passage 29 communicating with the passage 30 in the inlet of the trap body which is connected to the strainer body.

The valve member indicated at 31 in Figure 1 is of the double seat type and is connected at one end to a bimetallic element 32, the other end of which is connected to the inner end of a screwed adjusting stem 33 which extends outwardly through the end cap 19 and is located therein by means of a lock nut 34. A removable thimble 35 protects the projecting end of the adjusting stem 33. The operating temperature of the trap may be adjusted by screwing in or out the adjusting stem 33 so as to alter the initial relative position of the valve member 31.

This valve member 31 as shown more clearly in Figure 2, is of the double seat type and has a first closure surface 36 for co-operation with one seating in the valve seating 22 and a second closure surface 37 for co-operation with another seating in the valve seating 22.

In between the surfaces 36 and 37 is a waisted portion 38 and at the end adjacent the surface 37 there is a radially extending lip 39 from which projects centrally, a boss 40 which is of substantially spherical form being connected to the lip 39 by means of a short neck 41.

The bimetal element indicated at 32 is made up from a number of U shaped pieces 61 connected together in zig-zag form, and each end element 42 has its outermost end provided with a lateral projection which is bent over to form a resilient socket member 43. The connection between the ball 44 and socket member 43 is shown on an enlarged scale in Figure 4. The connection at the other end of the bimetal element 32 between the spherical boss 40 and socket member 43 is of the same form.

The substantially spherical boss 40 on the one end of the double seat valve 31 is engaged within the socket member 43 at the one end of the bimetal element and at the other end the socket 43 has engaged therein a ball 44 which is connected to, or formed integrally with, the inner end of the screwed adjusting stem 33.

The connection between the ball 44 and socket 43 at one end, and the substantially spherical boss 40 and socket 43 at the other end, form universal connections for the ends of the bimetal element.

To ensure accurate working of the valve so that the double seat valve 31 will close rapidly and accurately when the temperature rises above a predetermined value, it is essential that the centre line of the bimetal element 32 should always be in line with the axis of the valve member 31. Any misalignment which might arise through manufacturing tolerances in the fitting of the end cap 19 and adjusting stem 33 are corrected by the universal nature of the connection between the bimetal element 32 and the stem 33 on the one hand and the valve 31 on the other hand.

Further, any gravitational effects which might arise due to malpositioning of the trap are eliminated by virtue of the aforesaid universal connections which enable the valve 31 to centre itself correctly in alignment with the valve seat 32 by performing a pivotal movement relative to the bimetal element 32.

These bimetal elements are not designed to withstand any substantial mechanical stress, so that it is important to avoid any over-straining of any part of the bimetal element 32. The universal connections at each end ensure that when the element is expanding or contracting, its end portions can pivot freely relatively to the stem 33 and valve 31 so as to avoid any strain being imposed on any part of the element.

The valve seat member 22 illustrated in more detail in Figure 3, comprises a generally cylindrical body 45 formed with an axially extending opening 46 which has radially inwardly projecting shoulders spaced apart axially and providing valve seats 47 and 48 for co-operation with the corresponding seats on the valve member 31.

Externally, the body 45 is provided with a screwed portion 49 and an upper locating flange 50 so that it can be screwed into a suitably prepared opening in the part 21 of the body of the trap, and there is further provided a projecting flange 51, the flanges 50 and 51 making engagement with sealing surfaces on the part 21 of the trap body through the medium of suitable sealing washers as shown in Figure 1.

Intermediate the seats 47 and 48 the body 45 is formed with a suitable number of through passages 52 which place the central passage 46 in communication with the annular passage 23, and these passages 52 are inclined at an angle to the axis of the valve seats 47 and 48 and converge inwardly towards the waisted portion of the valve member 31 when this is in its working position as shown in Figure 1.

The arrangement enables the valve seat member 22 to be easily removed for the purpose of cleaning or servicing or for replacement.

What I claim then is:

1. A steam trap comprising a body having an inlet opening and a discharge for condensate, a passage within said body between said inlet and discharge, a valve member controlling fluid flow through said passage, a bimetal element located within a chamber within said body and communicating with said inlet, a substantially spherical boss on said valve member, a ball fixed relatively to said body, said bimetal element comprising a plurality of U-shaped strips connected by their legs in zig-zag formation, the extremity of the leg at each end of the element having a laterally projecting portion which is bent back on itself to form an open-ended resilient socket and the said spherical boss and ball being captively engaged in the sockets so formed.

2. A steam trap comprising a body having an inlet opening and a discharge for condensate, a passage within said body between said inlet and discharge, a valve member controlling fluid flow through said passage, a bimetal element located in a chamber within said body communicating with said inlet, a screwed adjusting stem mounted in said body, a substantially spherical boss on said valve member, a ball on the end of said adjusting stem, said bimetal element comprising a plurality of U-shaped strips connected by their legs in zig-zag formation, the extremity of the leg at each end of the element having a laterally projecting portion which is bent back on itself to form an open-ended resilient socket and the said spherical boss and ball being captively engaged in the sockets so formed.

References Cited in the file of this patent

UNITED STATES PATENTS

| | | |
|---|---|---|
| 897,285 | Greenaway | Sept. 1, 1908 |
| 1,004,684 | Comfort | Oct. 3, 1911 |
| 1,395,167 | Trane | Oct. 25, 1921 |
| 1,586,788 | Dunham | June 1, 1926 |
| 2,147,513 | Baker | Feb. 14, 1939 |

FOREIGN PATENTS

| | | |
|---|---|---|
| 570,457 | France | Jan. 16, 1924 |
| 577,025 | Great Britain | May 1, 1946 |